United States Patent
Ranjan et al.

(10) Patent No.: US 11,403,088 B2
(45) Date of Patent: Aug. 2, 2022

(54) UPGRADE OF HOSTS HOSTING APPLICATION UNITS OF A CONTAINER-BASED APPLICATION BASED ON ANALYSIS OF THE HISTORICAL WORKLOAD PATTERN OF THE CLUSTER

(71) Applicant: Hewlett Packard Enterprise Development LP, Houston, TX (US)

(72) Inventors: Jyoti Ranjan, Bangalore Karnataka (IN); Ajay Kumar Bajaj, Bangalore Karnataka (IN); Abhishek Kumar, Bangalore Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 342 days.

(21) Appl. No.: 16/811,313

(22) Filed: Mar. 6, 2020

(65) Prior Publication Data

US 2021/0279111 A1    Sep. 9, 2021

(51) Int. Cl.
  *G06F 8/65*   (2018.01)
  *G06F 9/50*   (2006.01)
  *G06F 9/455*  (2018.01)
  *G06F 8/60*   (2018.01)
  *G06F 9/54*   (2006.01)

(52) U.S. Cl.
  CPC .......... *G06F 8/65* (2013.01); *G06F 8/60* (2013.01); *G06F 9/455* (2013.01); *G06F 9/45533* (2013.01); *G06F 9/45558* (2013.01); *G06F 9/5077* (2013.01); *G06F 9/547* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

2020/0153898 A1* 5/2020 Sabath ............... G06F 8/65
2021/0248001 A1* 8/2021 Duggirala .......... G06N 5/022

OTHER PUBLICATIONS

Fairwinds, "The Fairwinds "Bestest Kubernetes Cluster Upgrade"," Jul. 26, 2018, pp. 1-6.

(Continued)

*Primary Examiner* — Qing Yuan Wu
(74) *Attorney, Agent, or Firm* — Jaffery Watson Mendonsa & Hamilton (57) ABSTRACT

Example implementations relate to a upgrade of a host that hosts application units of a container-based application. According to an example, monitoring is performed to identify new system software component availability for the cluster. When a new system software component is available, a historical workload pattern of the cluster is analyzed to identify an upgrade window for each host of the cluster. When the upgrade window arrives for a host, it is determined whether reconfiguration of an application is to be performed based on a capacity of the cluster. When the determination is affirmative, a reconfiguration option for the application is identified and a configuration of the application is adjusted accordingly. The host may then be drained, removed from the cluster, upgraded, added back into the cluster and any application configuration changes can be reversed.

20 Claims, 6 Drawing Sheets

(56) References Cited

OTHER PUBLICATIONS

Google Cloud, "Cluster Upgrades," Feb. 6, 2020, pp. 1-5, Retrieved from the Internet on Feb. 6, 2020 at URL: <docs.platform9.com/kubernetes/managed-kubernetes-2-3-cluster-upgrades/>.

Manually upgrading a cluster or node pool, https://cloud.google.com/kubernetes-engine/docs/how-to/upgrading-a-cluster, downloaded Feb. 3, 2020, 13 pages.

Sandeep Dinesh, "Kubernetes Best Practices: Upgrading Your Clusters with Zero Downtime," Jun. 1, 2018, 10 pages, Google Cloud.

Upgrade an Azure Kubernetes Services (AKS) cluster, Microsoft Docs, May 30, 2019, https://docs.microsoft.com/en-us/azure/aks/upgrade-cluster#upgrade-an-aks-cluster, downloaded.

* cited by examiner

UPGRADE OF HOSTS HOSTING APPLICATION UNITS OF A CONTAINER-BASED APPLICATION BASED ON ANALYSIS OF THE HISTORICAL WORKLOAD PATTERN OF THE CLUSTER

BACKGROUND

As a result of native tenets of simplified manageability, its immutable nature, scalability, its natural fit with microservices and DevOps architecture, among other things, the container eco-system has emerged as a prominent computing virtualization platform.

A container is a standard unit of software that packages up code and its dependencies so the application runs quickly and reliably from one computing environment (e.g., a container orchestration platform provided by Amazon Web Services (AWS) (e.g., the Amazon Elastic Kubernetes Service (EKS)), Google (e.g., the Google Kubernetes Engine (GKE)), or Microsoft (e.g., the Azure Kubernetes Service (AKS)) to another. Containers offer a logical packaging mechanism in which applications can be abstracted from the environment in which they actually run. Instead of virtualizing the hardware stack as with the virtual machines approach, containers virtualize at the operating system level, with multiple containers running atop the OS kernel of a host system directly. In order to achieve higher application availability, containerized applications may be replicated on a particular host system or replicas may be distributed over multiple host systems of a cluster.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to a proactive, adaptive and immutable container host upgrade approach based on the historical workload pattern of the cluster and the container behavior. In the following description, numerous specific details are set forth in order to provide a thorough understanding of example embodiments. It will be apparent, however, to one skilled in the art that embodiments described herein may be practiced without some of these specific details.

As with other computing platforms, servers or host computer systems (hosts) of a container orchestration platform are upgraded from time-to-time. In order to avoid application downtime as a host of a cluster is being updated, a traditional host upgrade approach involves the use of n+1 hosts. For example, a new host with an upgraded system software component (e.g., an operating system upgrade, a hypervisor upgrade, a container engine upgrade, or a firmware upgrade) is added to cluster to host the applications so that the old host (the target host) on which the applications are running can be upgraded. After target host has been upgraded, the new host that was temporarily added to the cluster is removed from the cluster. This process is then repeated n times to serially upgrade all of the hosts one by one. This approach has at least two limitations. First, the traditional host upgrade approach follows a reactive model, expecting someone (e.g., an administrator) to trigger the host upgrade. Second, the traditional approach, requires one extra host to do a round-robin upgrade. While one extra host may not appear to be an issue, consider the additional expense incurred by a cloud provider that supports one hundred clusters. Further still, consider the possibility of each cluster being comprised of a heterogeneous set of hosts, each potentially having different hardware capabilities, for example, some having multiple network interface cards (NICs), some having specialized graphics processing unit (GPU) cards, some having a large number of disks, etc. In such circumstances, n+1 hosts can turn into n+1 hosts for each cluster and for each type of host (or having an extra host having the highest common denominator of all possible capabilities).

Embodiments described herein seek to address various limitations of the traditional host upgrade approach involving the use of n+1 hosts. In one embodiment, a host upgrade system observes the deployed containers in the cluster for its hardware resource requirements, configuration and behavior. The host upgrade system may also proactively monitor for availability of system software components and trigger a host upgrade at a point in time at which the cluster is likely to have relatively low load as determined based on observations of the historical load over a period of time. Alternatively, an administrator can define the upgrade window. In embodiments described herein, assuming the cluster to be upgraded includes X hosts, an intelligent host draining approach is implemented to drain the host to be upgraded (the target host) and make use of the remaining X−1 hosts. According to one embodiment, an appropriate host draining strategy is performed to drain the target host based on the capacity in the cluster (e.g., memory, storage and compute capacity and availability of specialized hardware functionality within the remaining X−1 hosts) to host the applications running on target host. At the time of the host upgrade, when sufficient capacity exists among the remaining X−1 hosts to support the applications currently running on the target host, then the applications are migrated to the remaining X−1 hosts within the cluster before removing the target host from the cluster and upgrading the target host; otherwise, an alternative, application-centric host draining approach is performed. In one embodiment, the various potential application-centric host draining approaches include reconfiguring the applications running on the target host by reducing the replica set, reducing resource consumption, or throttling the application programming interface (API) so as to facilitate draining of the host in a manner that maintains operability of the application on the cluster, albeit, potentially at reduced capacity. In one embodiment, based on characteristics of the application at issue, an appropriate host draining approach is pre-configured for each application running on the target host during a host upgrade planning process that takes into consideration resource requirements of application units that make up the application, the configuration of the application units, the historical workload pattern to which the application units are subjected. In this manner, overprovisioning of hardware, which can be both costly and challenging in a heterogeneous cluster, can be avoided.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein, a "system software component" generally refers to a software component of a host computer system that provides an environment for applications to be run or otherwise supports the operation of applications. As such, applications are stopped or migrated before upgrading system software components. Non-limiting examples of system software components include the host operating system, drivers, the basic input/output system (BIOS), firmware, the hypervisor, the containerization engine. System software components specifically exclude application software.

As used herein, a "host upgrade" generally refers to an upgrade that is performed with respect to a hardware component and/or a system software component of a host computer system.

As used herein, an "application unit" generally refers to a set of elemental services or microservices that form a part of an application and that should be migrated as a whole in order to maintain proper application functionality. An application may be comprised of multiple application units. Non-limiting examples of application units include a web server layer or platform (e.g., an Apache HTTP Server), an application layer (e.g., a web application framework), a database layer or platform, a search layer or platform, a storage layer or platform, and a caching layer or platform. For example, in the context of the Ceph storage platform (an example of an application unit), the elemental services are an object storage daemon (OSD), a monitor and a reliable autonomic distributed object store (RADOS) gateway. Based on the configuration of application unit, a different set of instances can be deployed for different elemental services. For example, one instance of a Ceph storage platform may include $X_1$ (e.g., 20) instances of the OSD, $Y_1$ (e.g., 4) instances of the monitor and $Z_1$ (e.g., 2) instances of the RADOS gateway and another instance of a Ceph storage platform may include $X_2$ (e.g., 10) instances of the OSD, $Y_2$ (e.g., 2) instances of the monitor and $Z_2$ (e.g., 1) instances of the RADOS gateway. Also, different elemental services of an application unit may rely on different sets of hardware capabilities. As such, migration of some elemental services may be limited to particular types of hosts. In view of the foregoing, as described further below, embodiments seek to understand the application units of an application and the composition of the application units in terms of the configuration of the elemental services.

Figure 1:
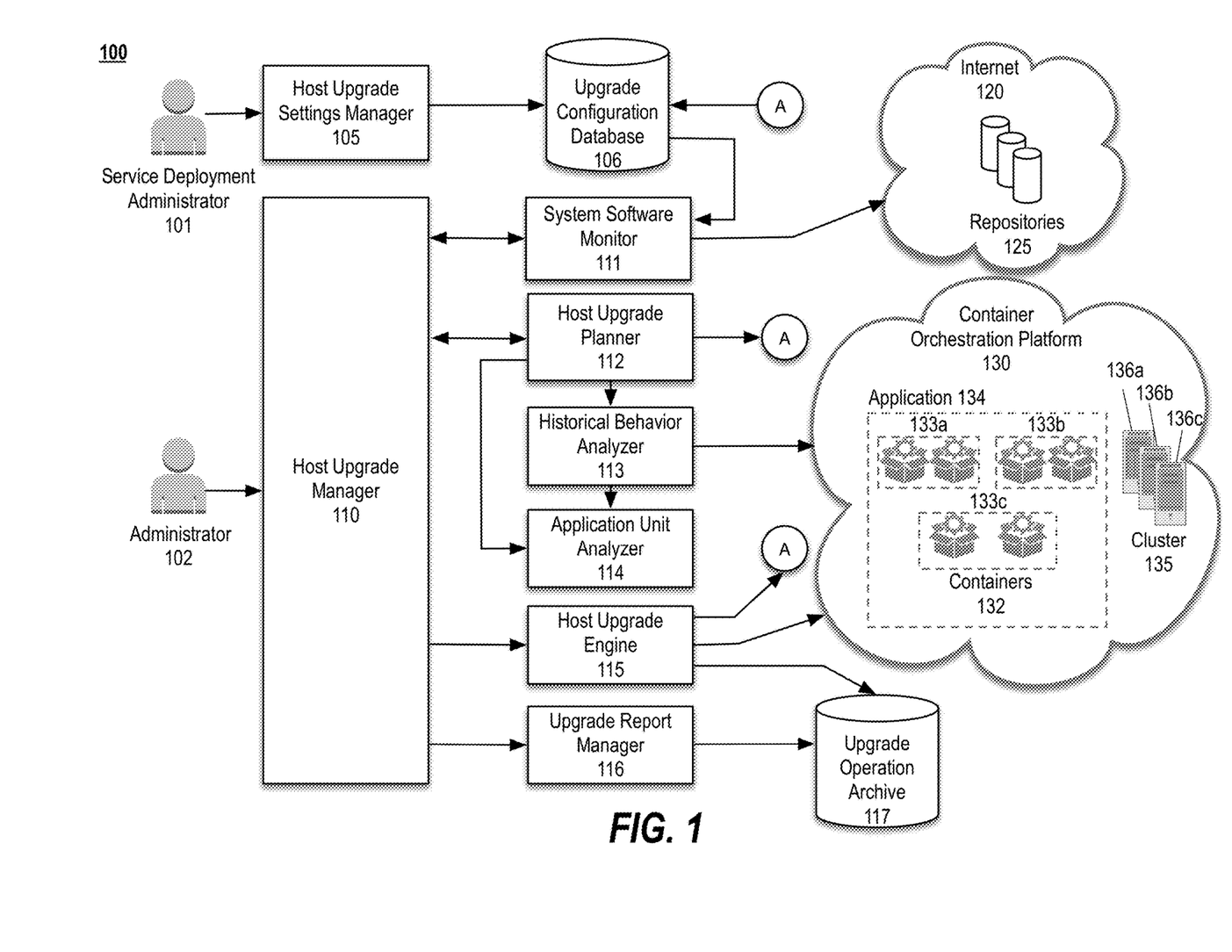
FIG. 1 is a block diagram conceptually illustrating a host upgrade system in accordance with an example embodiment.

FIG. 1 is a block diagram conceptually illustrating a host upgrade system 100 in accordance with an example embodiment. In the context of the present example, the host upgrade system 100 includes a host upgrade settings manager 105, a host upgrade manager 110, an upgrade configuration database 106, a system software monitor 111, a host upgrade planner 112, a historical behavior analyzer 113, an application unit analyzer 114, a host upgrade engine 115, and upgrade report manager 116, and an upgrade operation archive 117.

The host upgrade settings manager 105 may be responsible for facilitating specification of preferences about various aspects relating to the host upgrade process by a service deployment administrator 101. In the context of the present example, the preferences relate to performance of a host upgrade for hosts 136a-c of cluster 135 in which an application 134 (represented in the form of multiple containers 132) is run on the hosts 136a-c. In one embodiment, the host upgrade settings manager 105 may provide a graphical user interface through which the service deployment administrator 101 may input their preferences. For example, the preferences may include information regarding one or more of a host upgrade window of time, a list of repositories and system software components to monitor, upgrade frequency, and order of upgrade. The service deployment administrator 101 may also provide access keys for respective repositories to allow the system software monitor 111 to access the repositories.

The information regarding the host upgrade window of time may indicate whether the system should select the upgrade time window or whether the host upgrade is to be performed during a window of time specified by the service deployment administrator 101.

The information regarding the list of repositories and the system software components to monitor may provide universal resource locators (URLs) or APIs of code repositories to be monitored for upgrades to specifically identified system software components.

The information regarding the upgrade frequency may indicate how many times an upgrade may be carried out over the course of a predetermined or configurable amount of time (e.g., one day) regardless of the availability of an upgrade to a system software component. In view of the short release cycles facilitated by today's DevOps ecosystem, providing a limit on upgrade frequency may help to create balance between keeping hosts up-to-date and performing upgrades too frequently.

The information regarding the order of upgrade may specify whether there should be a delay between successive host upgrades within a monitored cluster (e.g., cluster 135 of container orchestration platform 130) or whether all hosts (e.g., hosts 136a-c) of the cluster should be upgraded serially without delay. According to one embodiment, the various preferences relating to various aspects of the host upgrade process provided by the service deployment administrator 101 (including any access keys for the repositories) are persisted in the upgrade configuration database 106.

In the context of the present example, the host upgrade manager 110 represents the core of the system 100 and orchestrates with various other components to carry out the proactive, adaptive and immutable upgrade in accordance with the discovery of container behavior and keeping preferences specified by the service deployment administrator 101 in mind. In one embodiment, an administrator 102 may direct the host upgrade manager 110 to cause the system software monitor 111 to initiate polling for availability of upgrades.

Turning now to the system software monitor 111, once initiated, it may poll various repositories 125 accessible via the Internet 120 for the availability of new versions or releases of system software components. For example, the system software monitor 111 may periodically request those repositories registered by the service deployment administrator 101 for the availability of system software components and compare the new system software components to those being monitored (e.g., those specified by the service deployment administrator 101). When a new version of a monitored system software component is available, the system software monitor 111 may notify the host upgrade manager 110.

According to one embodiment, the host upgrade planner 112 is responsible for designing a host upgrade plan including sufficient information to allow the host upgrade engine 115 to perform a host upgrade for each host 136*a-c* in the cluster 135. In one embodiment, the host upgrade planner 112 provides the host upgrade plan in the form of a data structure indicating the actionable steps for the upgrade of all hosts 136*a-c* and provides this information to the host upgrade manager 110. In one embodiment, the administrator 102 may be given an opportunity to review and approve the host upgrade plan before it is implemented.

The design and generation of the host upgrade plan may include determining which host needs to be upgraded and when as well as determining the host draining strategy for one or more applications (e.g., application 134) running on the host being subjected to the host upgrade. In the context of the present example, the host upgrade planner 112 makes use of input from various other components (e.g., the historical behavior analyzer 113, the upgrade configuration database 106, and the application unit analyzer 114) to make the determinations. An example of host draining strategy determination processing that may be performed by the host upgrade planner 112 is described in further detail below with reference to FIG. 4.

The historical behavior analyzer 113 may be responsible for analyzing historical behavior of the cluster 135 and containers 132 associated with the cluster 135 to determine appropriate time slots for performing a host upgrade for each host. Non-limiting examples of the container orchestration platform 130 include Amazon EKS, GKE and AKS.

In one embodiment, the historical behavior analyzer 113 is responsible for determining an optimal time slot for host upgrade, predicting or forecasting a minimum number of instances of each container of the cluster for serving the average workload during a time of least load, and determining whether the resource limit for the container can be reduced in certain circumstances to facilitate draining of the host on which the container runs. For example, the historical behavior analyzer 113 may analyze application workload and resource utilization of a given container over a period of time. The trend may then be analyzed to figure out the time-window in which service is expected to consume the least amount of resources and is likely to experience low user workload. An example of historical behavior analysis processing that may be performed by the historical behavior analyzer 113 is described below with reference to FIG. 3.

In the context of the present example, the application unit analyzer 114 is responsible for understanding an application unit 133*a-c* and its composition in terms of the configuration of elemental services. For example, the application unit analyzer 114 may crawl all deployed application units 133*a-c* and discover the elemental services forming the application unit along with the configuration of the elemental services. The application unit analyzer 114 may also be responsible for determining whether it is better to shut down the elemental services during a host upgrade or to migrate the elemental services. Shutting down the elemental services might be more efficient in a scenarios in which migrating services might cause a great deal of rebuilding or communications among peers. For example, in the context of a Ceph storage platform (a specific, non-limiting example of an application unit), OSD services (a specific, noon-limiting example of an elemental service) are tied to each disk of the host, so there is no point in draining the Ceph storage platform to another host. Instead, it is better to shut down the OSD services, perform the host upgrade and then restart the OSD services again. In one embodiment, if elemental services of an application unit are to be migrated as part of its application unit, the application unit analyzer 114 is also responsible for determining to which hosts the elemental services can be migrated. For example, the application unit analyzer 114 may identify hardware dependencies of each elemental service and compatible hosts.

The host upgrade engine 115 may be responsible for carrying out the upgrade job as requested by the host upgrade manager 110. For example, based on the host upgrade plan generated by the host upgrade planner 112 and upgrade preferences specified by the service deployment administrator 101, the host upgrade engine 115 may perform a round-robin host upgrade of all hosts in the cluster. An example of host upgrade processing that may be performed by the host upgrade engine 115 is described below with reference to FIG. 5.

While in the context of the present example, the service deployment administrator 101 and the administrator 102 are shown separately, those skilled in the art will appreciate that such administrative roles may be one and the same. While, for simplicity and for sake of brevity, only one monitored cluster of three hosts and one application running on the cluster is shown, those skilled in the art will appreciate, the methodology described herein is applicable to any number of clusters, hosts and applications. Similarly, while in the context of the present example, the application is shown having six containers representing three application units, those skilled in the art will appreciate more or fewer containers and application units than depicted may be used depending upon the particular implementation.

The various components (e.g., the monitors, planners, analyzers, engines and managers) of system 100 described above with reference to FIG. 1 and the processing described below with reference to the flow diagrams of FIGS. 2-5 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms, such as the computer system described with reference to FIG. 6 below.

While for sake of brevity, certain actions may be described with reference to the flow diagrams of FIGS. 2-5 as taking place in a particular order and in series, those skilled in the art will appreciate some of these actions may be performed in an alternative order than presented and/or in parallel with one or more other actions. As such, the particular order in which the blocks of the respective flow diagrams are depicted is not intended to be limiting.

Figure 2:
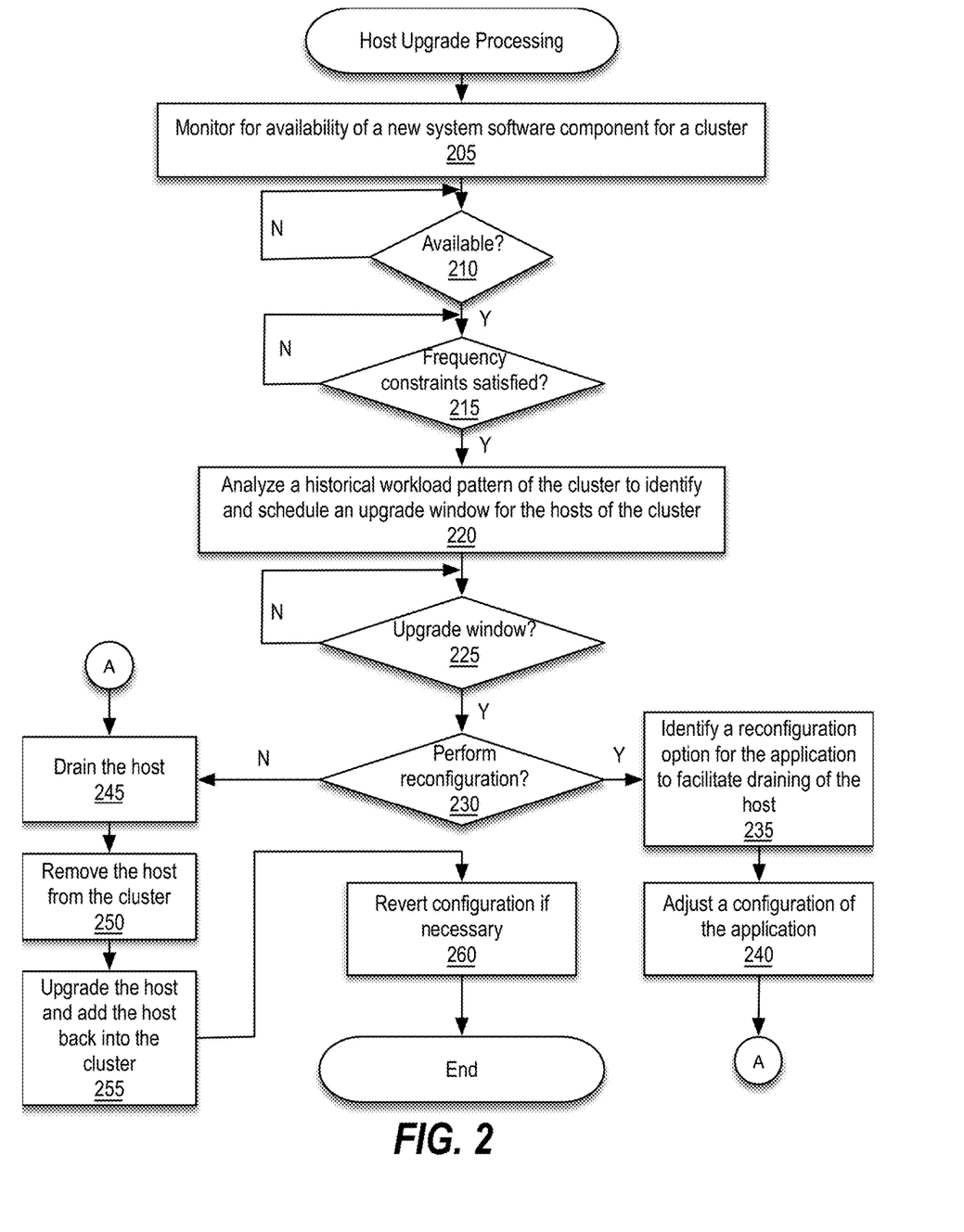
FIG. 2 is a high-level, end-to-end flow diagram illustrating host upgrade processing in accordance with an example embodiment.

FIG. 2 is a high-level, end-to-end flow diagram illustrating host upgrade processing in accordance with an example embodiment. According to one embodiment, the host upgrade processing is performed by a host upgrade system (e.g., host upgrade system 100). At block 205, monitoring is performed to detect the availability of a new system software component for a cluster. For example, a system software component monitor (e.g., system software monitor 111) may periodically poll a list of registered repositories (e.g., repositories 125) for the existence of new versions or releases of system software components.

At decision block 210, availability is determined. For example, the system software component monitor may determine whether any of the new system software components found in block 205 correspond to those to be monitored by a service deployment administrator (e.g., service deployment administrator 101). In one embodiment, the service deployment administrator has previously provided a list of system software components to be monitored the availability of which should cause a host upgrade process to be performed. Alternatively, by default, the existence of any new system software component within a registered repository may trigger performance of the host upgrade process (subject to frequency constraints, if any).

At decision block 215, a determination is made regarding whether zero or more frequency constraints are satisfied. According to one embodiment, the service deployment administrator is provided with the ability to establish a limit on the number of host upgrades that may be performed over a predetermined or configurable amount of time (e.g., one day). If such a limit has been established by default or by the service deployment administrator, a comparison is made between the number of host upgrades that have been performed during the predetermined or configurable amount of time and the limit. When the frequency constraints are satisfied, processing continues with block 220; otherwise, processing loops back to decision block 215 for periodic re-evaluation until the frequency constraints are satisfied, for example, as a result of one or more prior host upgrades falling outside of the predetermined or configurable time window. Alternatively, if no frequency constraints on host upgrades have been configured, then processing continues with block 220.

At block 220, a historical workload pattern of the cluster is analyzed to identify and schedule an upgrade window for the hosts (e.g., hosts 136a-c) of the cluster (e.g., cluster 135). For example, in one embodiment, a historical behavior analyzer (e.g., historical behavior analyzer 113) accesses and evaluates load information (e.g., maintained in one or more logs by the cluster or by the container orchestration platform) over time for the hosts of the cluster and/or the containers (e.g., containers 132) to identify time slots for each of the hosts during which the hosts are likely to have low load. In one embodiment, the determination of such time slots may involve performing deep learning of container and/or cluster behavior. Subject to being overridden by host upgrade windows of time specified by the service deployment administrator 101, the determined time slots may be incorporated into a host upgrade plan generated by a host upgrade planner (e.g., host upgrade planner 112).

At decision block 225, a determination is made regarding whether the current time corresponds to an upgrade window for one of the hosts. If so, then processing continues with decision block 230; otherwise processing loops back to decision block 225 for periodic reevaluation. According to one embodiment, if the process is to proceed to block 230, a host upgrade engine (e.g., host upgrade engine 115) is invoked by a host upgrade manager (e.g., host upgrade manager 110) to initiate performance of host upgrades for all hosts in the cluster based on the host upgrade plan developed by the host upgrade planner.

At decision block 230, a determination is made regarding whether the host draining strategy will involve reconfiguration of an application (e.g., application 134) running on the host to be upgraded. When the host draining strategy will involve reconfiguration of an application, processing continues with block 235; otherwise processing continues with block 245. According to one embodiment, this determination is made based on the current capacity of the cluster and the current availability of hosts having specialized hardware on which one or more elemental services of an application unit (e.g., application unit 133a-c) deployed on the host to be upgraded are dependent. In a scenarios in which the remaining hosts in the cluster have sufficient capacity to run the application(s) currently being run on the host to be upgraded, then the host draining strategy need not involve reconfiguration of an application and the applications running on the host to be upgraded can be migrated to the remaining hosts. However, when the cluster (i) is operating at or near capacity and the remaining hosts will not be able to host the application(s) currently being run on the host to be upgraded without risk of impacting cluster availability or operability of the application(s); and/or (ii) cannot currently support migration of an application unit as a result of lack of capacity of the remaining hosts that have a particular hardware functionality (e.g., the presence of a graphics processing unit (GPU)) upon which one or more elemental services of the application unit are dependent, then an application centric reconfiguration option may be considered to facilitate draining of the host to be upgraded.

At block 235, a reconfiguration option for the application is identified to facilitate draining of the host to be upgraded. In one embodiment, the host upgrade planner has previously performed application unit analysis, selected the reconfiguration option for the application, and stored the selection in the host upgrade plan. In such an embodiment, identifying the reconfiguration option involves parsing the host upgrade plan to locate the previously selected reconfiguration option for the application at issue. In alternative embodiments, the application unit analysis and selection of an application-centric reconfiguration option may be performed by the host upgrade engine in real-time. As noted above, an example of the host draining strategy determination processing that may be performed is described in further detail below with reference to FIG. 4.

At block 240, the configuration of the application is adjusted in accordance with the identified reconfiguration option. For example, the application may be configured to (i) temporarily run the application with a reduced replica count; (ii) run multiple replicas on the same host until the host upgrade is completed; (iii) reduce CPU and/or RAM usage, for example, via tuning parameters; and/or (iv) throttling the number of API calls accepted by the application.

At block 245, the host is drained. For example, when no application reconfiguration is warranted, then the application(s) running on the host are migrated to the remaining hosts in the cluster. In some examples, block 245 may be performed after a negative determination at decision block 230. In some examples, the process may arrive at block 245 after having performed blocks 235 and 240.

At block 250, the host is removed from the cluster.

At block 255, the host is upgraded and then added back to the cluster. In one embodiment, the upgrade process follows an immutable approach in which components are replaced rather than incrementally changed. For example, the host may be rebuilt from the ground up including installation of the new system software component.

At block 260, the configuration of the application is reverted to its pre-host draining state. For example, in one embodiment, to the extent an application was reconfigured (e.g., reconfiguration of replica usage, API throttling, etc.) to facilitate draining of the host, the prior configuration of the application is restored.

While for ease of explanation the above example illustrates a polling loop for determining whether the current time is associated with an upgrade window of one of the hosts of the cluster, it should be appreciated that depending upon the particular implementation, a scheduled task may be configured to occur for each of the hosts based on their respective upgrade time slots. Similarly, while the above example, is explained with reference to a single application, the processing associated with blocks 230-260 may be repeated for each application running on the host to be upgraded.

Figure 3:
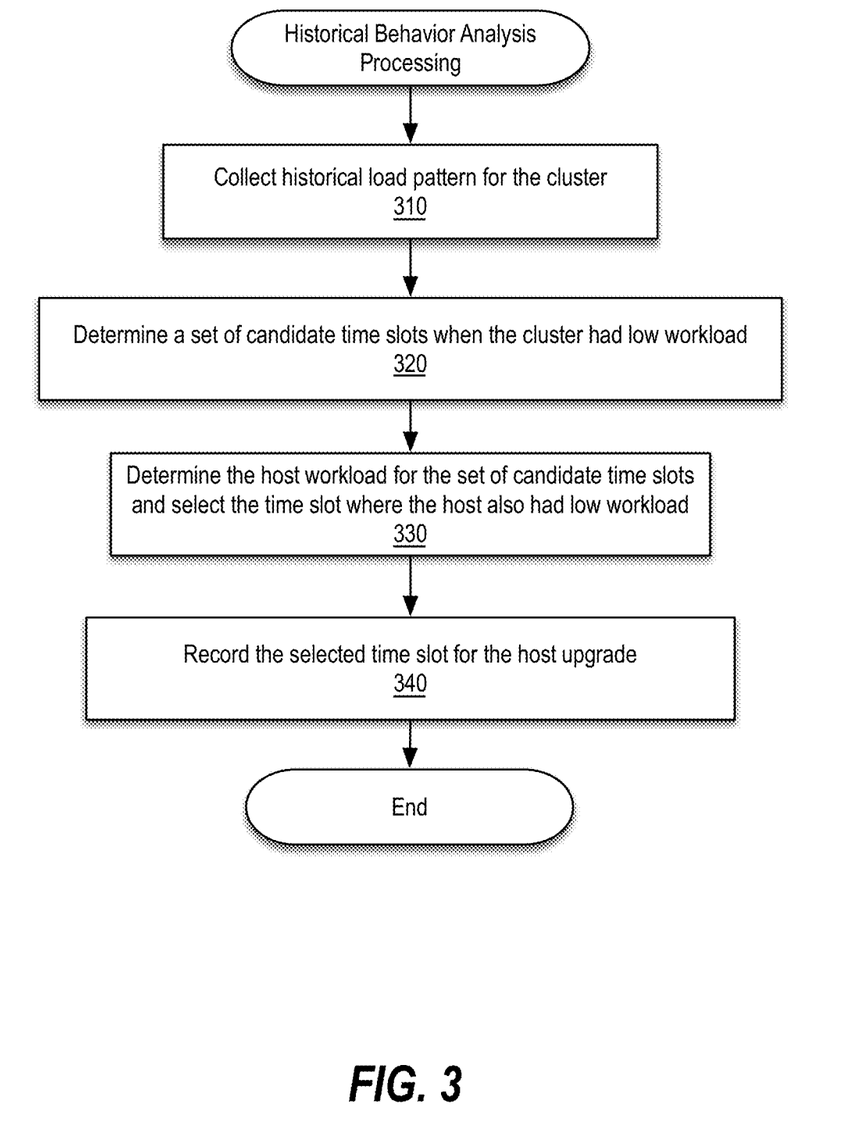
FIG. 3 is a flow diagram illustrating historical behavior analysis processing in accordance with an example embodiment.

FIG. 3 is a flow diagram illustrating historical behavior analysis processing in accordance with an example embodiment. According to one embodiment, the historical behavior analysis processing is performed by a historical behavior analyzer (e.g., historical behavior analyzer 113) as part of a host upgrade planning process. At block 310, a historical load pattern for the cluster (e.g., cluster 135) whose hosts (e.g., hosts 136a-c) are to be upgraded is collected. In one embodiment, the historical load pattern for the cluster includes historical load over time for both the cluster and the containers (e.g., containers 132) running the various microservices making up the applications (e.g., application 134) running on each host is retrieved from one or more logs maintained by the cluster or by the container orchestration platform (e.g., container orchestration platform 130).

At block 320, a set of candidate time slots when the cluster typically has low workload are determined. For example, the historical load information can be analyzed to identify patterns in the workload fluctuation based on day of the week, time of day, holiday schedules and the like. In one embodiment, the determination of such time slots may involve performing deep learning of cluster behavior.

At block 330, the host workload is determined for the set of candidate time slots and the a time slot is selected in which both the cluster and the host have historically had a low level of workload. In one embodiment, the selection of such time slots may involve performing deep learning of cluster and host behavior.

At block 340, the selected time slot is recorded for the host upgrade. In one embodiment, the selected time slot for the host is stored in a host upgrade plan that can subsequently be used by a host upgrade engine (e.g., host upgrade engine 115) to perform the host upgrade.

While, for simplicity, the above example is described with reference to a single host, blocks 330 and 340 can be repeated for each host of the cluster.

Figure 4:
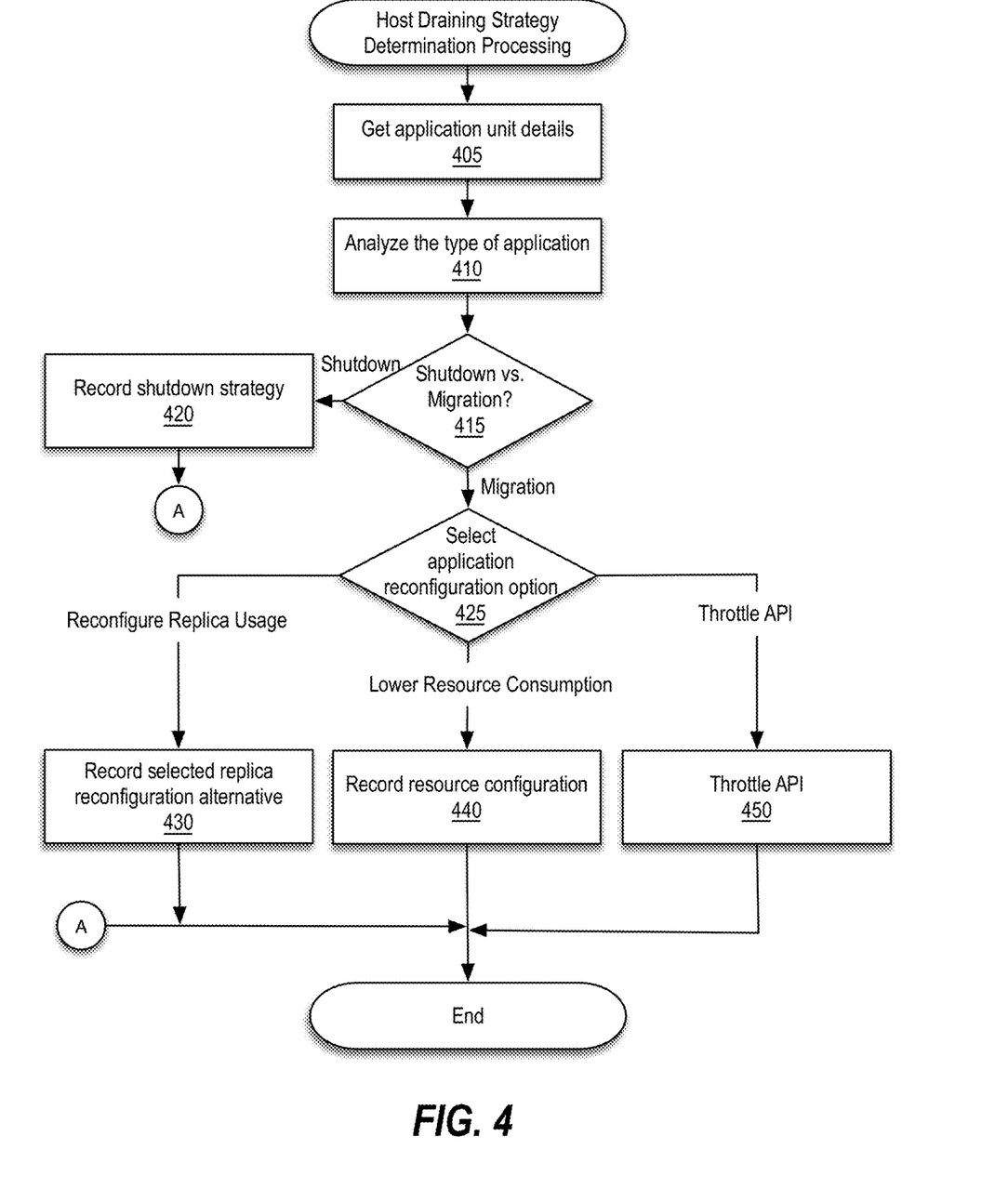
FIG. 4 is a flow diagram illustrating host draining strategy determination processing in accordance with an example embodiment.

FIG. 4 is a flow diagram illustrating host draining strategy determination processing in accordance with an example embodiment. In embodiments described herein, an application-centric host draining strategy is performed when hosts (e.g., hosts 136a-c) of a monitored cluster (e.g., cluster 135) are to be upgraded, but the cluster is at or near capacity or one or more applications running on the host to be upgraded can only be run on a limited number of hosts in the cluster that have specialized hardware capabilities (e.g., GPU(s), NICs, large storage capacity, etc.) that are running at or near capacity. As such, embodiments identify an appropriate reconfiguration option specifically tailored for each application running on the host based on characteristics of the application, including one or more of the type of application (e.g., stateful, stateless, CPU centric, or memory centric), the resource requirements of the application units of the application (e.g., hardware dependencies of elemental services making up the application units) and the configuration of the application units. For example, stateful applications may be reconfigured at an application storage level, whereas in other cases the CPU and/or memory of the application container may be tuned.

According to one embodiment the host draining strategy determination processing is performed during a host upgrade planning process performed by a host upgrade planner (e.g., host upgrade planner 112). At block 405, application unit details are obtained for an application running on a host of the monitored cluster. In one embodiment, an application unit analyzer (e.g., application unit analyzer 114) crawls all deployed application units within the cluster to discover:

The composition of the application units;
The current configuration of elemental services of the application units;
Which hosts of the cluster are eligible to migrate elemental services of the application units; and
Whether elemental services should be paused during host upgrade.

At block 410, the type of the application is analyzed. According to one embodiment, the type of application (e.g., stateful, stateless, CPU centric or memory centric) may be used in connection with determining appropriate reconfiguration options that are specifically tailored for the application.

At decision block 415, a determination is made regarding whether a particular application unit should be shut down or reconfigured (e.g., migrated). When the determination is to shut down a particular application unit or service, processing branches to block 420; otherwise, processing continues with decision block 425. As noted above, in the context of a Ceph storage platform (a specific, non-limiting example of an application unit), OSD services (a specific, non-limiting example of an elemental service) are tied to each disk of the host. In such a scenario, there is no point in draining the Ceph storage platform to another host; rather, it is better to shut down the OSD services, perform the host upgrade and then restart the OSD services again. Other non-limiting examples in which a shutdown determination may be made in favor of reconfiguring the application include scenarios in which migrating services is expected to cause a great deal of rebuilding or communications among peers.

At block 420, the shutdown strategy is recorded. For example, the host upgrade planner may record the shutdown strategy for the application in the host upgrade plan for future reference by a host upgrade engine (e.g., host upgrade engine 115).

At decision block 425, an application reconfiguration option is selected. In the context of the present example, there are three general options for lowering resource consumption of an application unit to accommodate draining of applications from the host to be upgraded. The first option may involve reconfiguring the use of replicas. In one embodiment, this first option has two alternatives (e.g., reducing the replica set vs. implementing multiple replicas on the same host). When reducing the replica set, the application may be reconfigured to temporarily run with a reduced replica count. For example, the application unit deployed on the host that is to be upgraded can be shut down during the host upgrade and the remaining replicas distributed on other hosts will handle the workload. Alternatively, multiple replicas may be run on the same host until the host upgrade is completed. For example, the application unit can be temporarily migrated from the host to be upgraded to another host in the cluster that has capacity to support the application unit. The second option may involve reducing resource consumption of the application to accommodate the fact that the application load will be handled by the remaining X−1 hosts. For example, the application may be tuned to lower CPU and/or RAM usage. The third option may involve throttling or otherwise limiting API requests processed by the application. For example, the API may be configured to limit requests to a predetermined or configurable number of requests per second. According to one embodiment, if implementing one or more of the above general options is not thought to be sufficient, a background job may be scheduled to run on the remaining hosts to allow leftover resources to be used for the drained application.

In one embodiment, the reconfiguration option selected for the application is based on evaluation of the application unit details and the type of application and has a goal of avoiding negatively impacting cluster performance (e.g., by overburdening any of the remaining hosts of the cluster) and maintaining operability of the application at issue. For example, for stateful applications having specialized hardware requirements, such applications may be configured to use a lower replica count. Meanwhile, other non-critical applications may be tuned to throttle API requests so as to limit resource consumption.

When the application reconfiguration option selected for the application based on evaluation of the application unit details and the type of application is to reconfigure the use of replicas, processing continues with block 430, when the reconfiguration option selected is to reduce resource consumption, then processing continues with block 440, and when the reconfiguration option selected is to throttle the API, then processing continues with block 450.

At block 430, the selected replica reconfiguration alternative is recorded, for example, in the host upgrade plan.

At block 440, one or more tuning parameters of the application that may be adjusted are recorded, for example, in the host upgrade plan.

At block 450, the desired API rate is recorded, for example, in the host upgrade plan.

While, for sake of simplicity and brevity, the above example is explained with reference to a single application and a single host, the processing associated with FIG. 4 may be repeated for each application running on each host of all monitored clusters.

Figure 5:
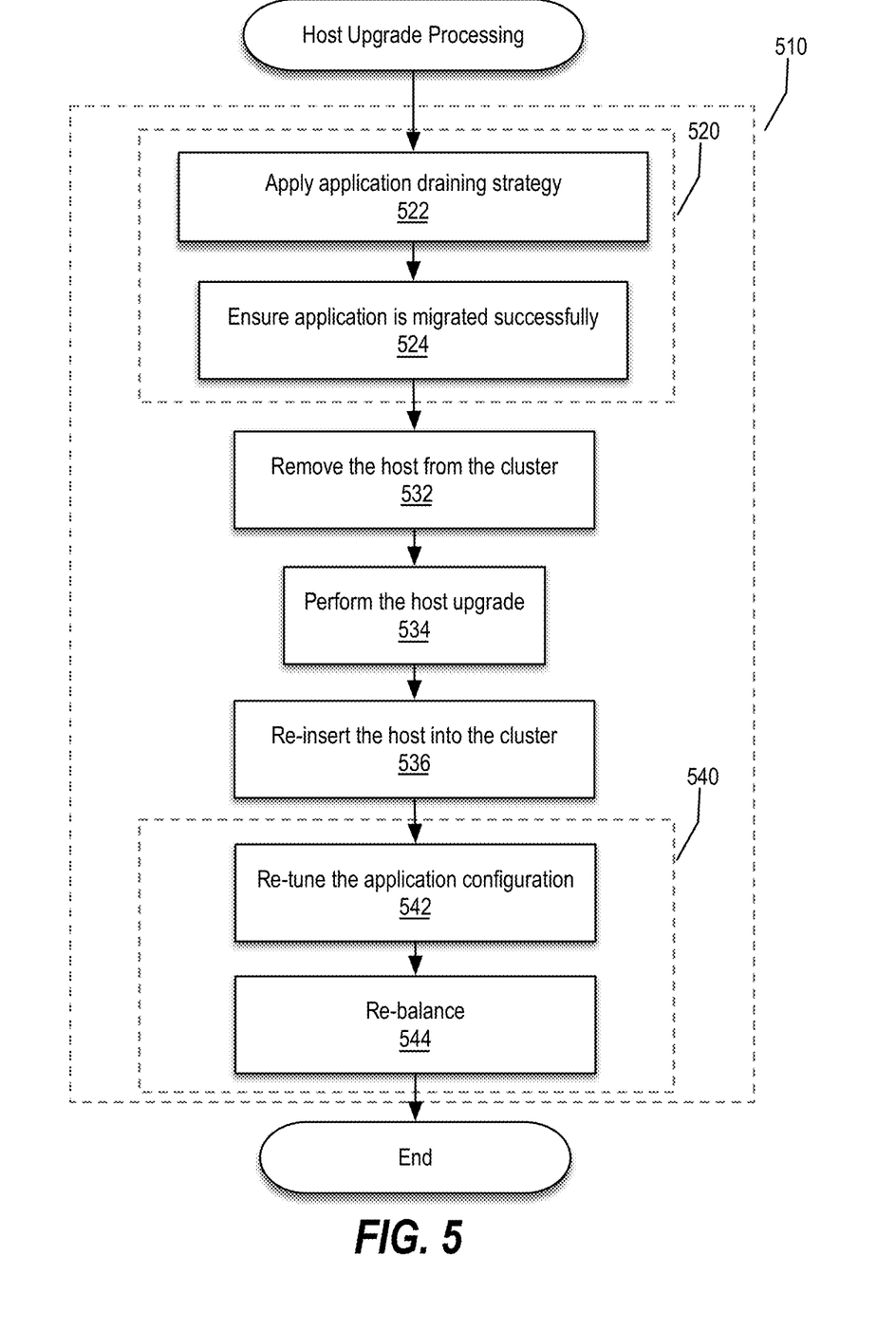
FIG. 5 is a flow diagram illustrating host upgrade processing in accordance with an example embodiment.

FIG. 5 is a flow diagram illustrating host upgrade processing in accordance with an example embodiment. According to one embodiment, the host upgrade processing is performed by a host upgrade engine (e.g., host upgrade engine 115). In the context of the present example, dotted outline 510 encompasses the blocks that may be repeated for every host (e.g., host 136a-c) in a cluster (e.g., cluster 135), dotted outline 520 encompasses the blocks that may be repeated for each application running on the host to be upgraded, and dotted outline 540 encompasses the blocks that may be repeated for each drained application from the host that has been upgraded.

At block 522, the application draining strategy is applied for an application running on the host to be upgraded. In one embodiment, the draining strategy may involve (i) shutting down one or more services or application units associated with the application or (ii) reconfiguring (or migrating) the application as previously selected by a host upgrade planner (e.g., host upgrade planner 112). After the application draining strategy has been applied, information regarding the event (e.g., the type of event, the application at issue, the host at issue, the time and date, etc.) may be recorded to an upgrade log (e.g., upgrade operation archive 117).

At block 524, if the application or portion thereof (e.g., an application unit) has been migrated, before removing the host from the cluster, a test may be performed to verify the migration was successful.

At block 532, the host is removed from the cluster. Depending upon the particular container orchestration platform, the host may be removed from the cluster by the host upgrade engine by issuing platform specific commands, for example, marking the host as unschedulable, deleting containers from the host, and deleting the host.

At block 534, the host upgrade is performed. According to one embodiment, the host upgrade follows an immutable approach in which components are replaced rather than incrementally changed. For example, the host may be rebuilt from the ground up including installation of the new system software component. After the host has been upgraded, information regarding the event may be recorded to the upgrade log.

At block 536, the host is re-inserted into the cluster.

At block 542, the application is reconfigured in accordance with its state prior to the upgrade as appropriate.

At block 544, re-balancing is performed. Each orchestrator platform typically has a defined scheduler that takes care of re-balancing containers. For example, Docker swarm has a scheduling strategy, called "spread." If all the cluster nodes are running at least one task for the service, then the scheduler selects the node with the fewest tasks from the same service. In the context of a Kubernetes cluster, the re-balancing is automatically performed by the Kubernetes scheduler responsive to the cluster update.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 6:
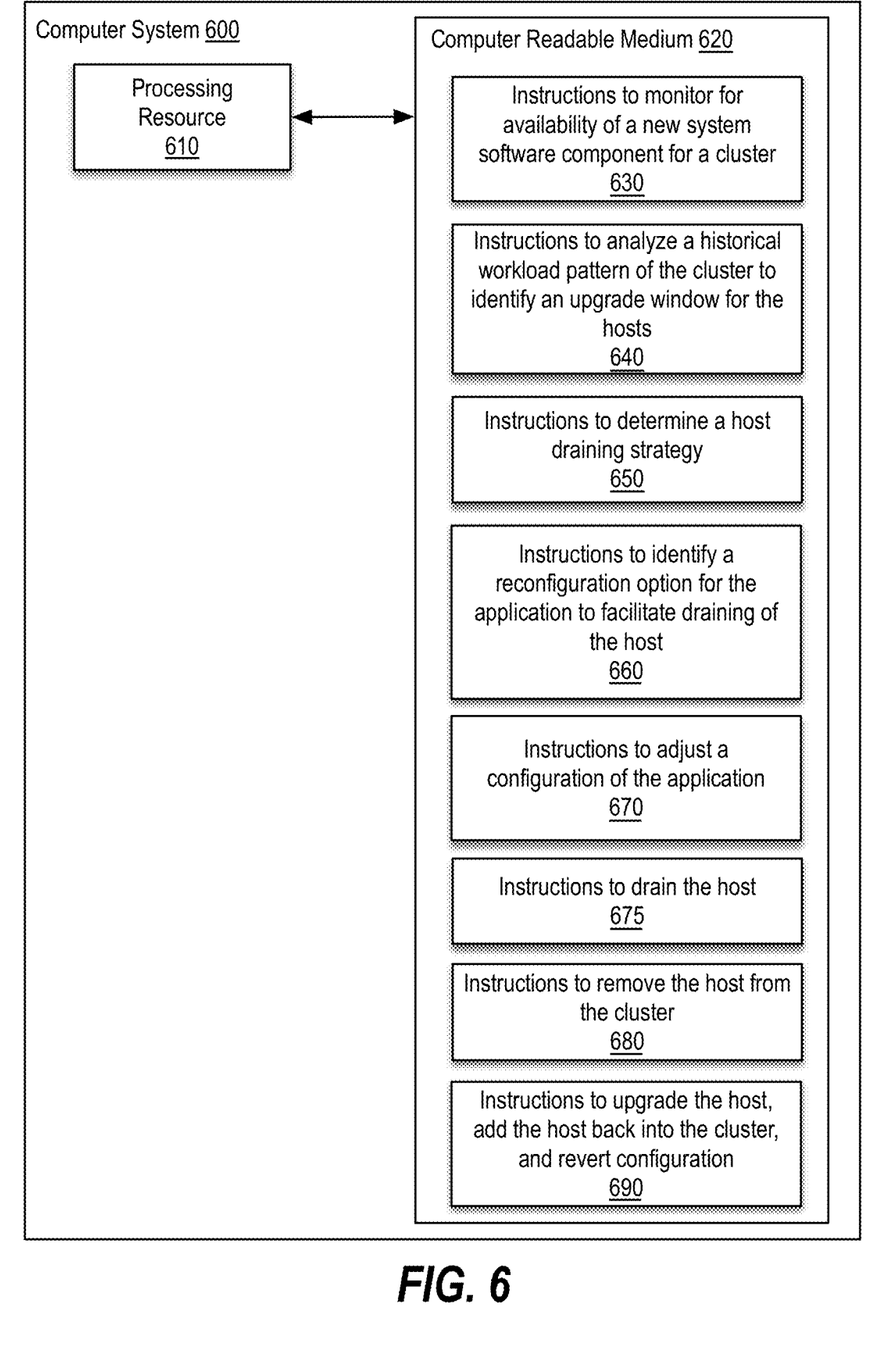
FIG. 6 is a block diagram of a computer system in accordance with an embodiment.

FIG. 6 is a block diagram of a computer system in accordance with an embodiment. In the example illustrated by FIG. 6, computer system 600 includes a processing resource 610 coupled to a non-transitory, machine readable medium 620 encoded with instructions to perform a proactive auto-scaling method in accordance with a private cloud embodiment. The processing resource 610 may include a microcontroller, a microprocessor, central processing unit core(s), an ASIC, an FPGA, and/or other hardware device suitable for retrieval and/or execution of instructions from the machine readable medium 620 to perform the functions related to various examples described herein. Additionally or alternatively, the processing resource 610 may include electronic circuitry for performing the functionality of the instructions described herein.

The machine readable medium 620 may be any medium suitable for storing executable instructions. Non-limiting examples of machine readable medium 620 include RAM, ROM, EEPROM, flash memory, a hard disk drive, an optical disc, or the like. The machine readable medium 620 may be disposed within the computer system 600, as shown in FIG. 6, in which case the executable instructions may be deemed "installed" or "embedded" on the computer system 600. Alternatively, the machine readable medium 620 may be a portable (e.g., external) storage medium, and may be part of an "installation package." The instructions stored on the machine readable medium 620 may be useful for implementing at least part of the methods described herein.

In the context of the present example, the machine readable medium 620 is encoded with a set of executable instructions 630-690. It should be understood that part or all of the executable instructions and/or electronic circuits included within one block may, in alternate implementations, be included in a different block shown in the figures or in a different block not shown.

Instructions 630, upon execution, cause the processing resource 610 to monitor for availability of a new system software component for a cluster. In one embodiment, instructions 630 may correspond generally to instructions for performing blocks 205-215 of FIG. 2.

Instructions 640, upon execution, cause the processing resource 610 to analyze a historical workload pattern of the cluster to identify an upgrade window for the hosts. In one embodiment, instructions 640 may correspond generally to instructions for performing the historical behavior analysis processing described with reference to FIG. 3 and/or block 220 of FIG. 2.

Instructions 650, upon execution, cause the processing resource 610 to determine a host draining strategy. In one embodiment, instructions 650 may correspond generally to instructions for performing the host draining strategy determination processing described with reference to FIG. 4 and/or decision block 230 of FIG. 2.

Instructions 660, upon execution, cause the processing resource 610 to identify a reconfiguration option for the application to facilitate draining of the host. In one embodiment, instructions 660 may correspond generally to instructions for performing block 235 of FIG. 2.

Instructions 670, upon execution, cause the processing resource 610 to adjust a configuration of the application. In one embodiment, instructions 670 may correspond generally to instructions for performing a portion of block 522 of FIG. 5 and/or block 240 of FIG. 2.

Instructions 675, upon execution, cause the processing resource 610 to drain the host. In one embodiment, instructions 670 may correspond generally to instructions for performing a portion of block 522 of FIG. 5 and/or block 245 of FIG. 2.

Instructions 680, upon execution, cause the processing resource 610 to remove the host from the cluster. In one embodiment, instructions 680 may correspond generally to instructions for performing block 532 of FIG. 5 and/or block 250 of FIG. 2.

Instructions 690, upon execution, cause the processing resource 610 to upgrade the host, add the host back into the cluster, and revert the configuration the application if previously adjusted to accommodate draining of the host. In one embodiment, instructions 680 may correspond generally to instructions for performing blocks 534, 536, and 542 of FIG. 5 and/or blocks 255 and 260 of FIG. 2.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
monitoring for availability of a new system software component for a cluster of a container orchestration platform, wherein the cluster includes a plurality of hosts each hosting one of a plurality of application units of a container-based application;
subject to constraints on a frequency of performing upgrades and responsive to the availability of the new system software component:
analyzing a historical workload pattern of the cluster to identify an upgrade window for each of the plurality of hosts;
when the upgrade window arrives for a host of the plurality of hosts, determining whether reconfiguration of the application is to be performed based on a capacity of the cluster;
when said determining is affirmative:
identifying a reconfiguration option for the application that allows the application unit of the plurality of application units deployed on the host to be drained from the host while maintaining operability of the application; and
adjusting a configuration of the application based on the identified reconfiguration option;
draining the host;
removing the host from the cluster;
upgrading the host based on the new system software component;

adding the host back into the cluster; and
if said determining was affirmative, then reverting the configuration of the application.

2. The method of claim 1, wherein said determining whether reconfiguration of the application is to be performed based on a capacity of the cluster includes determining whether the cluster has insufficient capacity to migrate the application unit deployed on the host to one of the plurality of hosts remaining in the cluster upon removal of the host.

3. The method of claim 1, wherein the new system software component comprises an operating system update, a hypervisor update, or a firmware update.

4. The method of claim 1, wherein said analyzing includes applying a deep learning algorithm to the historical workload pattern.

5. The method of claim 1, wherein said adjusting a configuration of the application comprises:
running the application with a reduced replica count within the cluster;
running multiple replicas of the application on a particular host of the plurality of hosts;
tuning the application to throttle application programming interface (API) calls;
turning the application to reduce central processing unit (CPU) consumption; or
tuning the application to reduce random access memory (RAM) consumption.

6. The method of claim 1, further comprising:
during a host upgrade planning stage discovering a set of elemental services forming each of the plurality of application units and their respective configurations by crawling the plurality of application units;
selecting the reconfiguration option for the application from among a plurality of reconfiguration options based on resource requirements of each set of elemental services of each of the plurality of application units, the respective configurations of the plurality of application units, and a historical workload pattern to which the plurality of application units are subjected; and
storing information regarding the selected reconfiguration option in a host upgrade plan.

7. The method of claim 6, wherein said identifying a reconfiguration option for the application comprises retrieving the reconfiguration option from the host upgrade plan.

8. The method of claim 1, further comprising receiving preferences from an administrator regarding:
an upgrade frequency threshold indicative a maximum number of upgrades that are permitted to be performed during a predefined or configurable period of time; or
an order of upgrade indicative of whether the plurality of hosts are to be upgraded successively or whether to delay for a predetermined or configurable amount of time between host upgrades.

9. The method of claim 1, further comprising configuring said monitoring based on a list of repositories and system software components.

10. A non-transitory machine readable medium storing instructions executable by a processing resource of a computer system, the non-transitory machine readable medium comprising instructions to:
monitor for availability of a new system software component for a cluster of a container orchestration platform, wherein the cluster includes a plurality of hosts each hosting one of a plurality of application units of a container-based application;
subject to constraints on a frequency of performing upgrades and responsive to the availability of the new system software component:
analyze a historical workload pattern of the cluster to identify an upgrade window for each of the plurality of hosts;
when the upgrade window arrives for a host of the plurality of hosts, determine whether reconfiguration of the application is to be performed based on a capacity of the cluster;
when the determination is affirmative:
identify a reconfiguration option for the application that allows the application unit of the plurality of application units deployed on the host to be drained from the host while maintaining operability of the application; and
adjust a configuration of the application based on the identified reconfiguration option;
drain the host;
remove the host from the cluster;
upgrade the host based on the new system software component;
add the host back into the cluster; and
if the determination was affirmative, then revert the configuration of the application.

11. The non-transitory machine readable medium of claim 10, wherein the determination regarding whether reconfiguration of the application is to be performed based on a capacity of the cluster includes determining whether the cluster has insufficient capacity to migrate the application unit deployed on the host to one of the plurality of hosts remaining in the cluster upon removal of the host.

12. The non-transitory machine readable medium of claim 10, wherein the upgrade window for each of the plurality of hosts is identified by applying a deep learning algorithm to the historical workload pattern.

13. The non-transitory machine readable medium of claim 10, wherein the configuration of the application is adjusted by:
causing the application to be run with a reduced replica count within the cluster;
causing multiple replicas of the application to be run on a particular host of the plurality of hosts;
tuning the application to throttle application programming interface (API) calls;
turning the application to reduce central processing unit (CPU) consumption; or
tuning the application to reduce random access memory (RAM) consumption.

14. The non-transitory machine readable medium of claim 10, further comprising:
instructions to:
during a host upgrade planning stage, discover a set of elemental services forming each of the plurality of application units and their respective configurations by crawling the plurality of application units;
select the reconfiguration option for the application from among a plurality of reconfiguration options based on resource requirements of each set of elemental services of each of the plurality of application units, the respective configurations of the plurality of application units, and a historical workload pattern to which the plurality of application units are subjected; and
store information regarding the selected reconfiguration option in a host upgrade plan.

15. The non-transitory machine readable medium of claim 14, wherein the reconfiguration option for the application is identified by retrieving the reconfiguration option from the host upgrade plan.

16. The non-transitory machine readable medium of claim 10, further comprising:
instructions to receive preferences from an administrator regarding:
an upgrade frequency threshold indicative a maximum number of upgrades that are permitted to be performed during a predefined or configurable period of time; or
an order of upgrade indicative of whether the plurality of hosts are to be upgraded successively or whether to delay for a predetermined or configurable amount of time between host upgrades.

17. A system comprising:
a processing resource; and
a non-transitory computer-readable medium, coupled to the processing resource, having stored therein instructions that when executed by the processing resource cause the processing resource to:
monitor for availability of a new system software component for a cluster of a container orchestration platform, wherein the cluster includes a plurality of hosts each hosting one of a plurality of application units of a container-based application;
subject to constraints on a frequency of performing upgrades and responsive to the availability of the new system software component:
analyze a historical workload pattern of the cluster to identify an upgrade window for each of the plurality of hosts;
when the upgrade window arrives for a host of the plurality of hosts, determine whether reconfiguration of the application is to be performed based on a capacity of the cluster;
when the determination is affirmative:
identify a reconfiguration option for the application that allows the application unit of the plurality of application units deployed on the host to be drained from the host while maintaining operability of the application; and
adjust a configuration of the application based on the identified reconfiguration option;
drain the host;
remove the host from the cluster;
upgrade the host based on the new system software component;
add the host back into the cluster; and
if the determination was affirmative, then revert the configuration of the application.

18. The system of claim 17, wherein the determination regarding whether reconfiguration of the application is to be performed based on a capacity of the cluster includes determining whether the cluster has insufficient capacity to migrate the application unit deployed on the host to one of the plurality of hosts remaining in the cluster upon removal of the host.

19. The system of claim 17, wherein the configuration of the application is adjusted by:
causing the application to be run with a reduced replica count within the cluster;
causing multiple replicas of the application to be run on a particular host of the plurality of hosts;
tuning the application to throttle application programming interface (API) calls;
turning the application to reduce central processing unit (CPU) consumption; or
tuning the application to reduce random access memory (RAM) consumption.

20. The system of claim 17, wherein the instructions further cause the processing resource to:
during a host upgrade planning stage, discover a set of elemental services forming each of the plurality of application units and their respective configurations by crawling the plurality of application units;
select the reconfiguration option for the application from among a plurality of reconfiguration options based on resource requirements of each set of elemental services of each of the plurality of application units, the respective configurations of the plurality of application units, and a historical workload pattern to which the plurality of application units are subjected; and
store information regarding the selected reconfiguration option in a host upgrade plan.

* * * * *